United States Patent
Ganesan

(10) Patent No.: US 10,990,758 B2
(45) Date of Patent: Apr. 27, 2021

(54) LINGUISTIC SEMANTIC ANALYSIS MONITORING/ALERT INTEGRATION SYSTEM

(71) Applicant: Dell Products L.P., Round Rock, TX (US)

(72) Inventor: Vaideeswaran Ganesan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 15/971,858

(22) Filed: May 4, 2018

(65) Prior Publication Data
US 2019/0340242 A1    Nov. 7, 2019

(51) Int. Cl.
*G06F 40/30* (2020.01)
*G06F 40/242* (2020.01)
*G06F 40/205* (2020.01)
*G06F 16/35* (2019.01)
*G06F 11/30* (2006.01)

(52) U.S. Cl.
CPC .............. *G06F 40/30* (2020.01); *G06F 11/30* (2013.01); *G06F 16/35* (2019.01); *G06F 40/205* (2020.01); *G06F 40/242* (2020.01)

(58) Field of Classification Search
CPC ............. G06F 17/2785; G06F 17/2705; G06F 17/2735
See application file for complete search history.

(56) References Cited

U.S. PATENT DOCUMENTS

| | | | |
|---|---|---|---|
| 6,535,855 B1* | 3/2003 | Cahill | G06Q 20/00 340/540 |
| 8,126,826 B2* | 2/2012 | Pollara | G06N 20/00 706/14 |
| 2006/0085790 A1* | 4/2006 | Hintermeister | G06F 9/451 718/100 |

(Continued)

OTHER PUBLICATIONS

"Alert Consolidation," IBM Knowledge Center—Alert Consolidation, 2 Pages, https://www.ibm.com/support/knowledgecenter/en/SS6QYM_9.2.0/com.ibm.help.prod.concepts.doc/c_AlertConsolidation.html 2005.

*Primary Examiner* — Daniel C Washburn
*Assistant Examiner* — Oluwadamilola M Ogunbiyi
(74) *Attorney, Agent, or Firm* — Haynes and Boone, LLP

(57) ABSTRACT

A linguistic semantic analysis monitoring/alert integration system includes at least one storage device storing one or more monitoring dictionary databases that include module-specific language information that identifies module-specific language terms utilized in providing a monitoring module. A linguistic semantic monitoring analysis engine is coupled to the at least one storage device. The linguistic semantic monitoring analysis engine receives a file included in a monitoring module, parses the file to identify file language terms included in the file, and matches the file language terms included in the file with the module-specific language terms included in the module-specific language information. Based on the matching of the file programming language terms with the module-specific programming language terms, intent for the file language terms is determined and used to automatically classify the file into a respective one of a plurality of monitoring model databases.

20 Claims, 6 Drawing Sheets

(56) References Cited

U.S. PATENT DOCUMENTS

| | | | | |
|---|---|---|---|---|
| 2010/0223226 | A1* | 9/2010 | Alba | G06Q 30/02 706/55 |
| 2010/0235782 | A1* | 9/2010 | Powell | G06F 19/3418 715/809 |
| 2013/0262357 | A1* | 10/2013 | Amarasingham | G16H 50/30 706/21 |
| 2014/0067835 | A1* | 3/2014 | Harrison | G06F 8/61 707/755 |
| 2014/0214888 | A1* | 7/2014 | Marquardt | G06F 16/2228 707/769 |
| 2014/0365209 | A1* | 12/2014 | Evermann | G06F 17/279 704/9 |
| 2015/0178390 | A1* | 6/2015 | Torras | G06F 16/3344 707/706 |
| 2015/0324609 | A1* | 11/2015 | Grubel | H04L 63/105 726/26 |
| 2016/0210306 | A1* | 7/2016 | Kumarasamy | G06F 16/178 |
| 2017/0091046 | A1* | 3/2017 | Bangalore | G06F 16/156 |
| 2017/0155611 | A1* | 6/2017 | Ashoori | H04L 67/306 |
| 2017/0251006 | A1* | 8/2017 | LaRosa | H04L 63/1425 |
| 2018/0089155 | A1* | 3/2018 | Baron | G06F 17/2288 |
| 2019/0005012 | A1* | 1/2019 | Priestas | G06N 20/00 |
| 2019/0034542 | A1* | 1/2019 | Ming | G10L 15/22 |
| 2019/0043487 | A1* | 2/2019 | Rivkin | G06F 17/274 |
| 2019/0073354 | A1* | 3/2019 | Indenbom | G06N 20/00 |
| 2019/0179896 | A1* | 6/2019 | Anisimovich | G06F 17/2785 |
| 2019/0213250 | A1* | 7/2019 | Murphy | G06F 17/2785 |
| 2019/0236206 | A1* | 8/2019 | Chowdhury | G06F 16/335 |
| 2019/0244253 | A1* | 8/2019 | Vij | G06F 17/20 |
| 2019/0258461 | A1* | 8/2019 | Li | G06F 40/211 |
| 2019/0266281 | A1* | 8/2019 | Van Der Stockt | G06F 40/20 |
| 2019/0278664 | A1* | 9/2019 | Dornemann | G06F 11/14 |
| 2019/0279632 | A1* | 9/2019 | Kim | G10L 15/265 |
| 2019/0318100 | A1* | 10/2019 | Bhatia | H04L 63/1433 |
| 2019/0340078 | A1* | 11/2019 | Bangalore | G06F 16/178 |

\* cited by examiner

LINGUISTIC SEMANTIC ANALYSIS MONITORING/ALERT INTEGRATION SYSTEM

BACKGROUND

The present disclosure relates generally to information handling systems, and more particularly to the use of linguistic semantic analysis to provide for the integration of monitoring and alerts with information handling systems As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, storage devices, networking devices, and/or other computing devices, utilize applications that interact with the hardware and software in the computing devices. However, the integration of applications for use with computing devices raises some issues. For example, a computing device manufacturer may integrate applications with their computing devices that monitor the hardware and software in those computing devices, which typically involves identifying the systems management artifacts developed for the hardware (e.g., Management Information Bases (MIBs), profiles, schemas, Representational State Transfer (REST) interfaces, Application Programming Interfaces (APIs), etc.), and write code that integrates those system management artifacts with the applications. However, such activities are time intensive, as significant effort is involved in understanding and analyzing the meaning of elements utilized by the system management artifacts. Furthermore, requests for application integration are frequent, and the time intensive process discussed above prevents may of those requests from being satisfied. Further still, even when such requests are filled, integrating applications to operate with current computing device firmware is associated with the same issues, and thus even integrated applications will quickly fail to operate with all available firmware functionality (i.e., as that firmware is updated). Providing support for new computing device products presents similar issues, as even when a computing device product is provided with a library (e.g., a Python or Powershell library), application integration requires those libraries be studied to understand the meaning of their terms, along with the writing of "glue" logic to integrate them to operate with those applications.

For example, monitoring software such as, for example, Nagios software available at www.nagios.org, System Center Operations Manager (SCOM) available from MICROSOFT® of Redmond, Wash., United States, and Zabbix software available at www.zabbix.com, provide for the monitoring of inventory, performance metrics, configurations, health information, operational information, and/or a variety of other information associated with computing devices. Furthermore, the different monitoring software monitors, collects, and presents this information in different ways. Conventionally, computing device manufacturers attempt to identify variables in the MIBs, Meta-Object Facilities (MOFs), and RESTful schema, and then model those variables into different information models such as health information models, metric information models, configuration information models, and inventory information models. Furthermore, changes in these artifacts (e.g., enumeration changes, new variable additions, new alert definitions, new knowledge articles, etc.) must be identified, and updates must be properly represented in the monitoring software. Further still, this data must be reconciled across different protocols, with the common variables utilized in the different protocols mapped to each other. These operations are complicated by the fact that component tree structures for the systems that execute these applications are often not readily available. In addition, alerts that are based upon such monitoring and that notify users as to what is happening in the computing device are often duplicative.

Accordingly, it would be desirable to provide improved integration of monitoring and alerts provided for computing devices.

SUMMARY

According to one embodiment, an Information Handling System (IHS) includes a processing system; and a memory system that is coupled to the processing system and that includes instructions that, when executed by the processing system, cause the processing system to provide a linguistic semantic monitoring analysis engine that is configured to: receive a file included in a monitoring module; parse the file to identify file language terms included in the file; match the file language terms included in the file with the module-specific language terms that are included in module-specific language information that is stored in one or more monitoring dictionary databases; determine, based on the matching of the file programming language terms with the module-specific programming language terms, intent for the file language terms; and automatically classify, based on the determination of the intent for the file language terms, the file into a respective one of a plurality of monitoring model databases.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
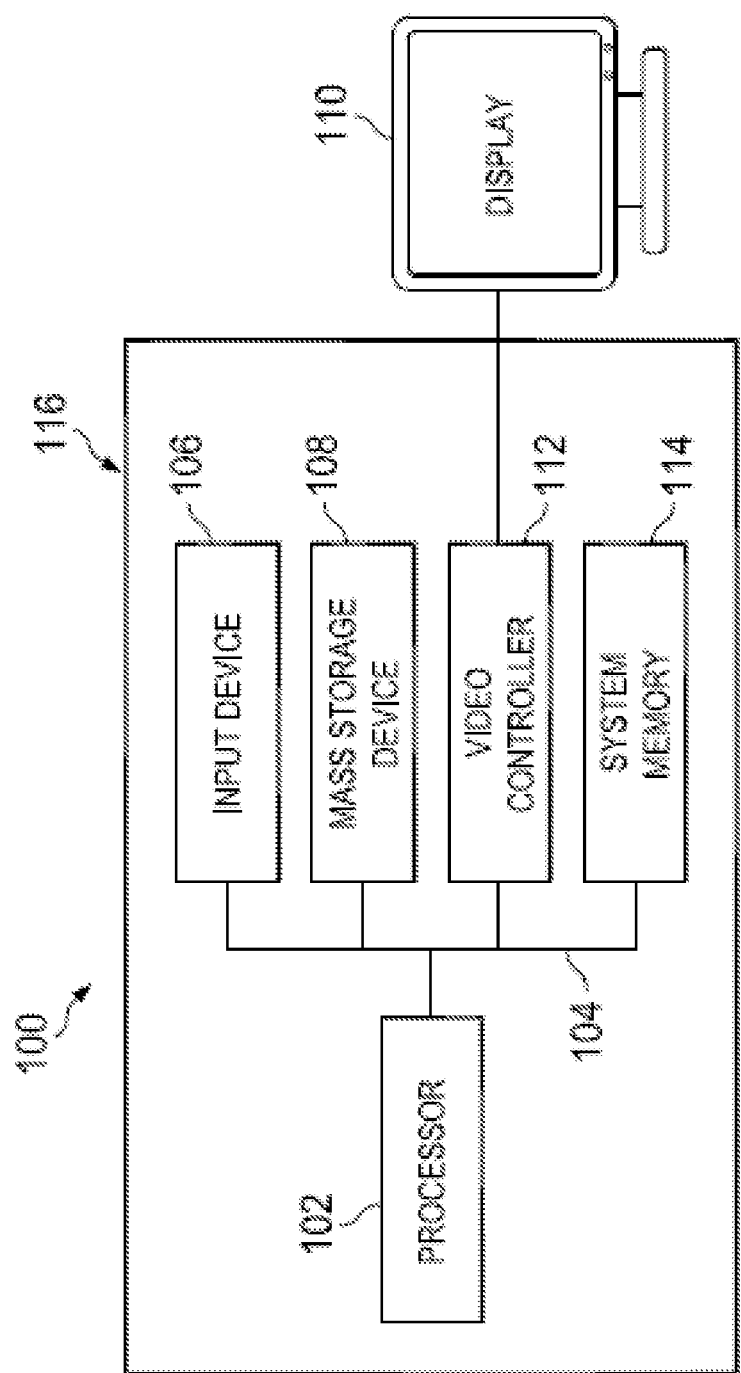
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
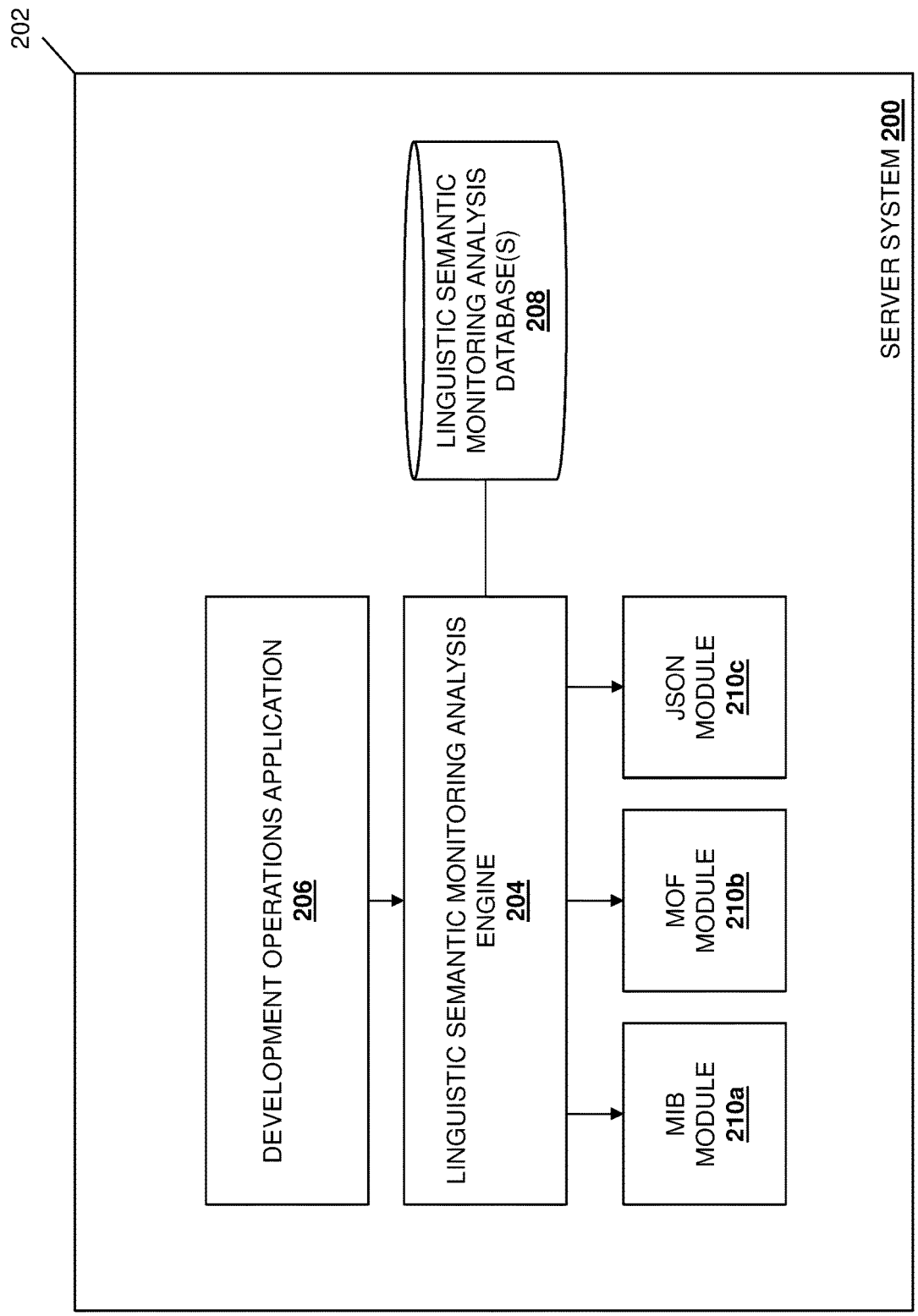
FIG. 2 is a schematic view illustrating an embodiment of a server system.

Referring now to FIG. 2, an embodiment of a server system 200 is illustrated. In an embodiment, the server system 200 may be provided by the IHS 100 discussed above with reference to FIG. 1, or may include some or all of the components of the IHS 100. In a specific embodiment, the server system 200 is provided by a single server device, although multiple server devices may provide the server system while remaining within the scope of the present disclosure as well. In the illustrated embodiment, the server system 200 includes a chassis 202 that houses the components of the server system 200, only some of which are illustrated in FIG. 2. For example, the chassis 202 may house a processing system (not illustrated, but which may include the processor discussed above with reference to FIG. 1) and a memory system (not illustrated, but which may include the memory 114 discussed above with reference to FIG. 1) that includes instructions that, when executed by the processing system, cause the processing system to provide a linguistic semantic monitoring analysis engine 204 that is configured to perform the functions of the linguistic semantic monitoring analysis engines and/or server systems discussed below.

The chassis 202 may also house a memory system (not illustrated, but which may include the memory 114 discussed above with reference to FIG. 1) that may include a development operations application 206. As would be understood by one of skill in the art, development operations is a software engineering culture and practice that aims at unifying software development and software operation to shorten application development cycles, increase application deployment frequency, and provide more dependable application releases. Thus, while a variety of applications may benefit from the teachings of the present disclosure, the systems and methods described herein have been found to provide particular benefits for development operations applications that are released faster and more frequently that other types of applications. In a specific example, development operations applications may include Nagios software, System Center Operations Manager (SCOM) software, Zabbix software, and/or a variety of other software that would be apparent to one of skill in the art in possession of the present disclosure.

The chassis 202 may also house a storage system (not illustrated, but which may include the storage device 108 discussed above with reference to FIG. 1) that includes one or more linguistic semantic monitoring analysis databases 208. As discussed below, the linguistic semantic monitoring analysis database(s) 208 may include module-specific programming language information that identifies module-specific programming language terms utilized in providing the development operations application 206. In an embodiment, the linguistic semantic monitoring analysis database(s) 208 may include a monitoring classifier dictionary with module-specific language information that includes module-specific language terms for monitoring performed by the development operations application 206. Such module-specific language information is configured for use by the linguistic semantic monitoring analysis engine 204 in classifying file names in monitoring modules, as discussed in further detail below.

In some embodiments, the linguistic semantic monitoring analysis database(s) 208 may identify health model variables such as "status", "indication", "predictive failure", and/or other monitoring-specific language terms that one of skill in the art in possession of the present disclosure will recognize are related to health monitoring. In some embodiments, the linguistic semantic monitoring analysis database(s) 208 may identify performance/metrics/time series/value variables such as "current", "reading", "usage", "statistics", "used", "free", "available", and/or other monitoring-specific language terms that one of skill in the art in possession of the present disclosure will recognize are related to performance/metrics/time series/value monitoring. In some embodiments, the linguistic semantic monitoring analysis database(s) 208 may identify inventory property variables such as "name", "type", "model", "manufacturer", "speed", "capacity", "family", "rated", and/or other monitoring-specific language terms that one of skill in the art in possession of the present disclosure will recognize are related to inventory property monitoring.

In some embodiments, the linguistic semantic monitoring analysis database(s) 208 may identify threshold type variables such as "threshold" and/or other monitoring-specific language terms that one of skill in the art in possession of the present disclosure will recognize are related to threshold monitoring. In some embodiments, the linguistic semantic monitoring analysis database(s) 208 may identify software versioning attributes such as "version", "revision", and/or other monitoring-specific language terms that one of skill in the art in possession of the present disclosure will recognize are related to software version monitoring. In some embodiments, the linguistic semantic monitoring analysis database(s) 208 may identify configuration state variables such as "state", "enabled", and/or other monitoring-specific language terms that one of skill in the art in possession of the present disclosure will recognize are related to configuration state monitoring. In some embodiments, the linguistic semantic monitoring analysis database(s) 208 may identify redundancy variables such as "redundancy", "fault tolerant", and/or other monitoring-specific language terms that one of skill in the art in possession of the present disclosure will recognize are related to redundancy variable monitoring.

In some embodiments, the linguistic semantic monitoring analysis database(s) 208 may also include type/model information that is related to how types can refer to models. For example, the type/model information may identify that gauges or integers with values of 0-100 generally indicate performance/metrics/time series variables. Furthermore, the type/model information may identify that integers with specific ranges of values do not indicate performance variables. Further still, the type/model information may identify that enumerations that contain values such as "healthy", "error", "warning", and "degraded" typically indicate health model variables. While specific monitoring-specific language information that may be included in the linguistic semantic monitoring analysis database(s) 208 has been described, one of skill in the art will recognize that a wide variety of monitoring-specific language information that enables the functionality discussed below may be included in the linguistic semantic monitoring analysis database(s) 208 while remaining within the scope of the present disclosure.

The chassis 202 may also house a plurality of monitoring modules such as, for example, the Management Information Base (MIB) module 210a, the Meta-Object Facility (MOF) module 210b, and JavaScript Object Notation (JSON) module 210c illustrated in FIG. 2. As discussed in further detail below, the monitoring modules 210a, 210b, and 210c may represent modules that are to be utilized with the development operations application 206 when it is executed on the domain/target system to perform monitoring. As such the monitoring modules 210a-c may include updates, releases, and/or other modifications that are to-be integrated into the development operations application 206. As discussed in further detail below, the linguistic sematic monitoring analysis engine 204 utilizes the linguistic semantic monitoring analysis database(s) 208, and in some cases the development operations application 206 itself, to integrate the monitoring modules 210a-c for use with the development operations application 206 by any domain/target system/computing device for which module-specific language information has been provided in the linguistic semantic monitoring analysis database(s) 208. While a specific server system has been described, one of skill in the art in possession of the present disclosure will understand that server systems may include a variety of other components and/or component configurations for providing conventional server system functionality, as well as the functionality discussed below, while remaining within the scope of the present disclosure.

Figure 3:
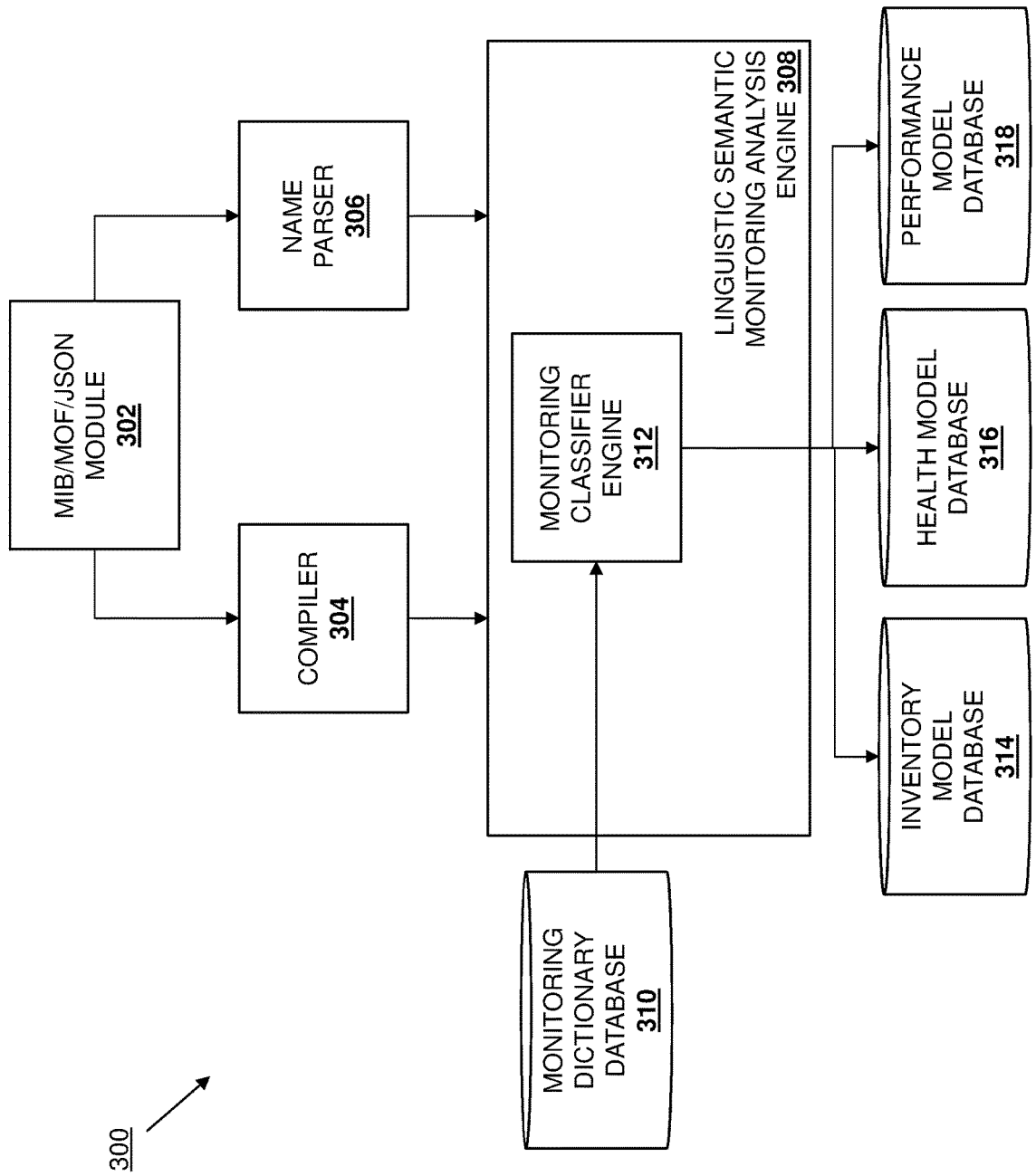
FIG. 3 is a schematic view illustrating an embodiment of the server system of FIG. 2A.

Referring now to FIG. 3, an embodiment of a server system 300 is illustrated that may be the server system 200 discussed above with reference to FIG. 1, and is provided for discussion in the examples below. As can be seen, any of the monitoring modules 302 (e.g., the MIB module, the MOF module, and JSON module discussed above) may provide information to a compiler 304 and a name parser 306, each of which process that information and provide it to a linguistic semantic monitoring analysis engine 308 for use in providing the functionality discussed below. The linguistic semantic monitoring analysis engine 308 also receives information from a monitoring dictionary database 310, and provides a monitoring classifier engine 312 that uses the information from the monitoring dictionary database 310 to classify information from the monitoring modules 302 into an inventory model database 314, a health model database 316, and a performance model database 318. While only three specific databases are illustrated, one of skill in the art in possession of the present disclosure will recognize that other monitoring model databases may be provided for module classification while remaining within the scope of the present disclosure.

Figure 4:
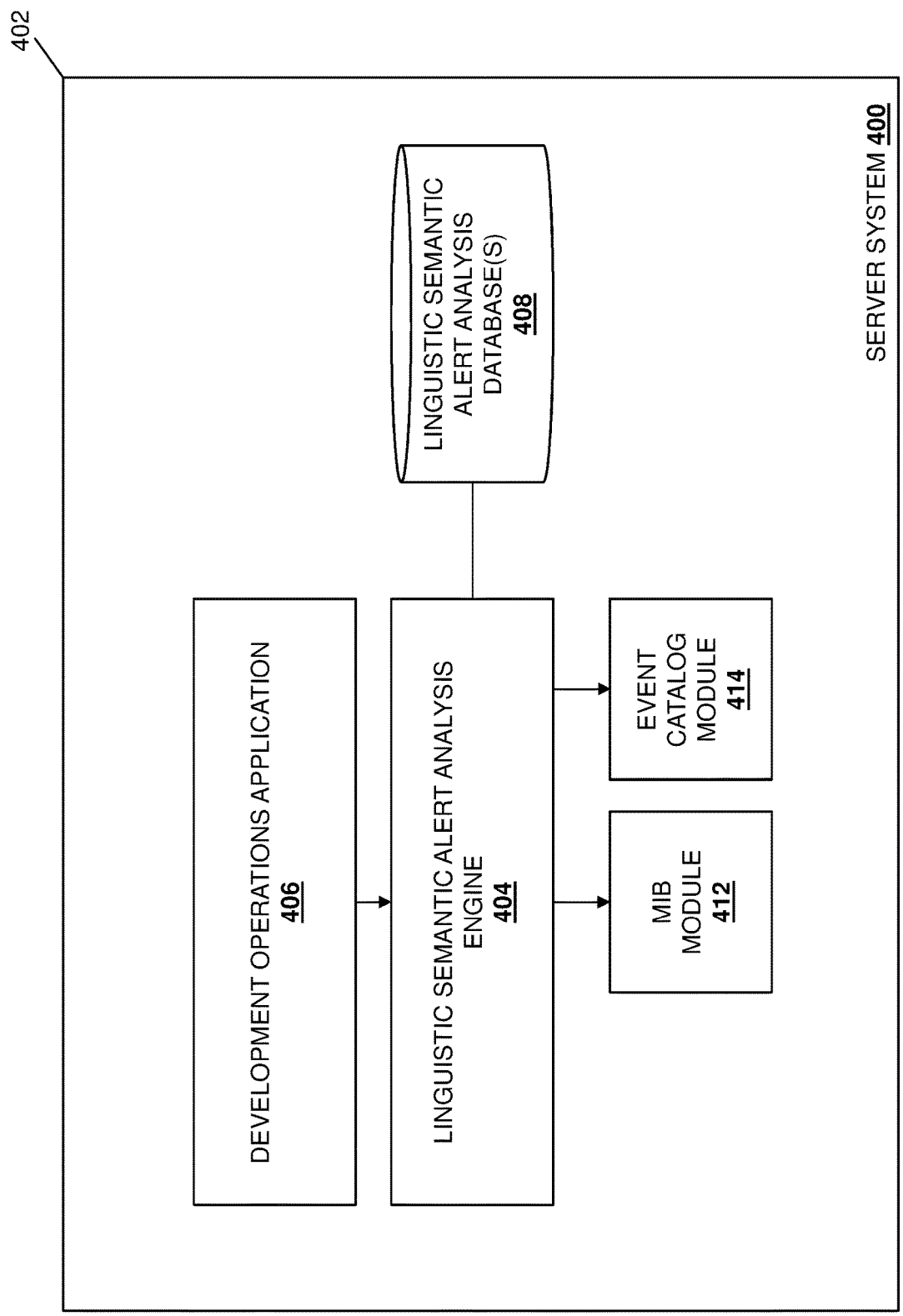
FIG. 4 is a schematic view illustrating an embodiment of a server system.

Referring now to FIG. 4, an embodiment of a server system 400 is illustrated. In an embodiment, the server system 400 may be provided by the IHS 100 discussed above with reference to FIG. 1, or may include some or all of the components of the IHS 100. In a specific embodiment, the server system 400 is provided by a single server device, although multiple server devices may provided the server system while remaining within the scope of the present disclosure as well. In the illustrated embodiment, the server system 400 includes a chassis 402 that houses the components of the server system 400, only some of which are illustrated in FIG. 4. For example, the chassis 402 may house a processing system (not illustrated, but which may include the processor discussed above with reference to FIG. 1) and a memory system (not illustrated, but which may include the memory 114 discussed above with reference to FIG. 1) that includes instructions that, when executed by the processing system, cause the processing system to provide a linguistic semantic alert analysis engine 404 that is configured to perform the functions of the linguistic semantic alert analysis engines and/or server systems discussed below. While the server system 200 and the server system 400 are illustrated and described herein as separate server systems, the server systems 200 and 400 may be provided by a common server system while remaining within the scope of the present disclosure. As such, in some embodiments, the functionality of the linguistic semantic monitoring analysis engine 204 and the linguistic semantic alert analysis engine 404 may be combined into a single engine while remaining within the scope of the present disclosure.

The chassis 402 may also house a memory system (not illustrated, but which may include the memory 114 discussed above with reference to FIG. 1) that includes a development operations application 406. As discussed above, development operations is a software engineering culture and practice that aims at unifying software development and software operation to shorten application development cycles, increase application deployment frequency, and provide more dependable application releases. Thus, while a variety of applications may benefit from the teachings of the present disclosure, the systems and methods described herein have been found to provide particular benefits for development operations applications that are released faster and more frequently that other types of applications. In a specific example, development operations applications may include Nagios software, System Center Operations Manager (SCOM), Zabbix software, and/or a variety of other software that would be apparent to one of skill in the art in possession of the present disclosure.

The chassis 402 may also house a storage system (not illustrated, but which may include the storage device 108 discussed above with reference to FIG. 1) that includes one or more linguistic semantic alert analysis databases 408. As discussed below, the linguistic semantic alert analysis database(s) 408 may include an alert classifier dictionary database 514 that includes module-specific programming language information that identifies module-specific programming language terms for alerts performed by the development operations application 406. Such module-specific language information is configured for use by the linguistic semantic alert analysis engine 404 in analyzing alerts to parse their meaning and identify their intent, as well as identify alerts belonging to different categories and perform alert resolution and consolidation, as discussed in further detail below.

In some embodiments, the linguistic semantic alert analysis database(s) 408 may include an alert classification dictionary database 514 that identifies health state changes such as "healthy", "failed", "degraded", "major", "fatal", "catastrophic", and/or other alert-specific language terms that one of skill in the art in possession of the present disclosure will recognize are related to health state change alerting. In some embodiments, the alert classification dictionary database 514 may identify threshold crossing events such as "exceeded", "below", "threshold", and/or other alert-specific language terms that one of skill in the art in possession of the present disclosure will recognize are related to threshold cross event alerting. In some embodiments, the alert classification dictionary database 514 may identify configuration events such as "enabled", "disabled", "configured", and/or other alert-specific language terms that one of skill in the art in possession of the present disclosure will recognize are related to configuration event alerting. In some embodiments, the alert classification dictionary database 514 may identify operational events such as "ready", "building", "starting", "initiating", "complete", and/or other alert-specific language terms that one of skill in the art in possession of the present disclosure will recognize are related to operation event alerting. In some embodiments, the alert classification dictionary database 514 may identify login/logout and/or security alerts such as "login", "logout", "security", and/or other alert-specific language terms that one of skill in the art in possession of the present disclosure will recognize are related to login/logout and/or security alerting.

In an embodiment, the linguistic semantic alert analysis database(s) 408 may include a domain-specific dictionary database 510 with nouns (or noun combinations) and verbs that are specific to a domain or other target system that is managed by the development operations application 406. For example, such a domain or target system may include the integrated Dell Remote Access Controller (iDRAC) available from DELL®, Inc. of Round Rock, Tex., United States. However, one of skill in the art in possession of the present disclosure will recognize that other domains or target systems will fall within the scope of the present disclosure as well. In a specific example, the domain-specific library may include noun or noun combinations such as "server configuration profile", "server profile", "factory inventory", "virtual disk", "physical disk", "light emitting device (LED)", "share", "credentials", "username", "password", "provisioning array", and "fast policy". In another specific example, the domain-specific library may include verbs such as "export", "import", "create", "modify", "delete", "set", "find", "get", "blink", "unblink", and "process".

In an embodiment, the linguistic semantic alert analysis database(s) 408 may include domain-specific component trees and/or other computing device information in a component tree database 508 that identifies components in a domain or target system that is configured to execute the development operations application 406. For example, for a server that is configured to execute the development operations application 406, the component tree database 508 may include "processor-memory-Redundant Array of Independent Disks (RAID)-system-iDRAC", while for a provisioning array that is configured to execute the development operations application 406, the component tree database 508 may include "volume-pool". In an embodiment, the linguistic semantic alert analysis database(s) 408 may include a domain-specific thesaurus database 510 that may include synonyms, antonyms, and state cycles. In a specific example, synonyms in the domain-specific thesaurus database 510 may include "set=modify=change=configure", "get=find", and "delete=remove". In a specific example, antonyms in the domain-specific thesaurus database 510 may include "export-import", "create-delete", and "blink-unblink". In a specific example, state cycles in the domain-specific thesaurus database 510 may include health cycle information such as "healthy-warning-critical" and lifecycle information such as "created-modified-building-deleted". In addition, the action tags may be associated with state cycle information. For example, "critical" may be associated with an action tag that requires "immediate action", while "warning" may be associated with an action tag that requires "action".

The chassis 402 may also house a plurality of alert modules such as, for example, the MIB module 412 and the event catalog module 414 illustrated in FIG. 4. As discussed in further detail below, the alert modules 412 and 414 may represent modules that are to be utilized with the development operations application 406 when it is executed on the domain/target system to provide alerts. As such the alert modules 408-412 may include updates, releases, and/or other modifications that are to-be integrated into the development operations application 406. As discussed in further detail below, the linguistic sematic alert analysis engine 404 utilizes the linguistic semantic alert analysis database(s) 408, and in some cases the development operations application 406 itself, to integrate the alert modules 412 and 414 for use with the development operations application 406 by any domain/target system/computing device for which module-specific information has been provided in the linguistic semantic alert analysis database(s) 408. While a specific server system has been described, one of skill in the art in possession of the present disclosure will understand that server systems may include a variety of other components and/or component configurations for providing conventional server system functionality, as well as the functionality discussed below, while remaining within the scope of the present disclosure.

Figure 5:
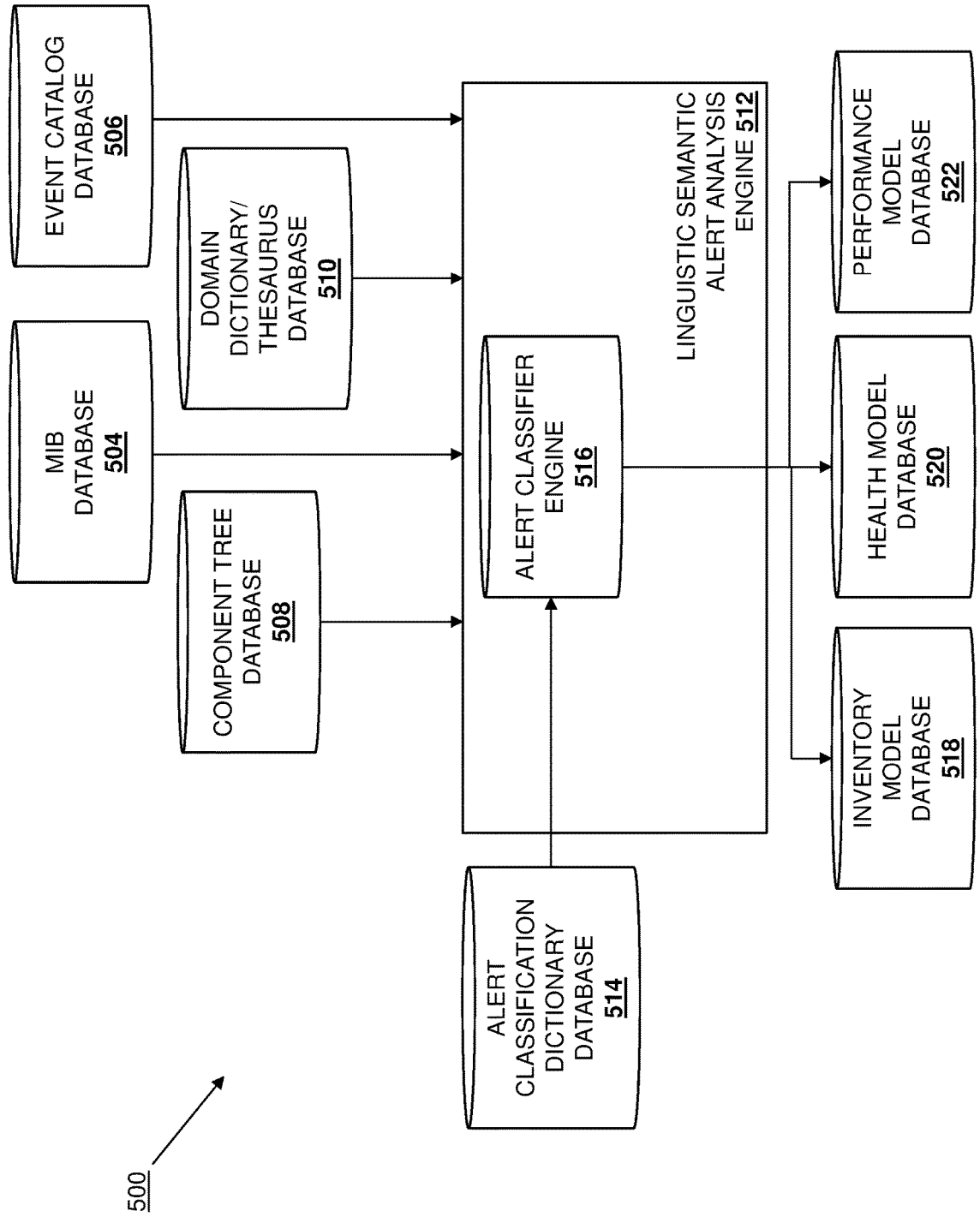
FIG. 5 is a schematic view illustrating an embodiment of the server system of FIG. 3A.

Referring now to FIG. 5, an embodiment of a server system 500 is illustrated that may be the server system 200 discussed above with reference to FIG. 1, and is provided for discussion in the examples below. As can be seen, any of an MIB database 504, an event catalog database 506, a component tree database 508, and a domain-specific dictionary/thesaurus database 510 may provide information to a linguistic semantic alert analysis engine 512. The linguistic semantic monitoring analysis engine 512 also receives information from an alert classifier dictionary database 514, and provides an alert classifier engine 516 that uses the information from the databases 504, 506, 508, 510, and 514 to classify alerts into an inventory model database 518, a health model database 520, and a performance model database 522. While only three alert model databases are illustrated, one of skill in the art in possession of the present disclosure will recognize that other alert module databases may be used to classify alerts while remaining within the scope of the present disclosure.

In a specific example utilizing an iDRAC, an event catalog database 506 provided according to the teachings of the present disclosure may include the following information in the table below:

In another specific example utilizing an iDRAC, an MIB database 504 provided according to the teachings of the present disclosure may include the following information below:

```
ObjectStatusEnum      ::= TEXTUAL-CONVENTION
STATUS current
DESCRIPTION
"Status of an object."
SYNTAX INTEGER {
other(1),          -- the status of the object is not one of the
                      following:
unknown(2),        -- the status of the object is unknown
                   -- (not known or monitored)
ok(3),             -- the status of the object is ok
nonCritical(4),    -- the status of the object is warning, non-critical
critical(5),       -- the status of the object is critical (failure)
nonRecoverable(6)  -- the status of the object is non-recoverable (dead)
}
ProcessorDeviceTableEntry ::= SEQUENCE {
processorDevicechassisIndex ObjectRange,
processorDeviceIndex ObjectRange,
processorDeviceStateCapabilities StateCapabilitiesFlags,
processorDeviceStateSettings StateSettingsFlags,
processorDeviceStatus ObjectStatusEnum,
```

| Component | Error # | Message | Causes and Resolution | Severity |
|---|---|---|---|---|
| PSU | 4233 | <PSU Sensor Name> has failed. | Cause: Power supply is failed. Resolution: Check the power supply assembly and switch on the power supply. | Critical |
| PSU | 4234 | <PSU Sensor Name> is switched OFF. | Cause: Power supply is turned off or A/C power is turned off Resolution: Turn on the A/C power and Power Supply. | Warning |
| PSU | 4235 | <PSU sensor name> is on. | | Informational |
| PDR | 2299 | Drive <number> is operating normally | | Informational |
| PDR | 2297 | Fault detected on Drive <number>. Drive has failed | Cause: Drive failed due to hardware failure. Resolution: Replace the failed disk | Critical |
| VDR | 4355 | <virtual disk> has returned to normal state | | Informational |
| VDR | 4356 | Redundancy of Virtual disk has degraded | Cause: One or more of physical disks must have failed. Resolution: Replace the failed physical disk and rebuild the virtual disk. | Warning |
| VDR | 4357 | Virtual disk failed | Cause: Virtual disk has failed. Resolution: Contact Dell to recover data from the virtual disk | Critical |
| Current | 2178 | The system board <name> current is within range. | | Healthy |
| Current | 2179 | The system board <name> current is less than the lower warning threshold. | | Warning |
| Current | 2179 | The system board <name> current is greater than the upper warning threshold. | | Warning |
| Current | 2180 | The system board <name> current is less than the lower critical threshold. | | Critical |
| Current | 2180 | The system board <name> current is greater than the upper critical threshold. | | Critical |

-continued

```
processorDeviceType ProcessorDeviceType,
processorDeviceManufacturerName String64,
processorDeviceStatusState ProcessorDeviceStatusState,
processorDeviceFamily ProcessorDeviceFamily,
processorDeviceMaximumSpeed Unsigned32BitRange,
processorDeviceCurrentSpeed Gauge,
processorDeviceExternalClockSpeed Unsigned32BitRange,
processorDeviceVoltage Signed32BitRange,
processorDeviceVersionName String64,
processorDeviceCoreCount Unsigned32BitRange,
processorDeviceCoreEnabledCount Unsigned32BitRange,
processorDeviceThreadCount Unsigned32BitRange,
processorDeviceCharacteristics Unsigned16BitRange,
processorDeviceExtendedCapabilities Unsigned16BitRange,
processorDeviceExtendedSettings Unsigned16BitRange,
processorDeviceBrandName String64,
processorDeviceFQDD FQDDString
}
```

One of skill in the art in possession of the present disclosure will recognize that, in the example provided above, only processor details and the process health enumeration is described herein for brevity, and the MIB database 504 may (and typically will) include a variety of other information while remaining within the scope of the present disclosure.

In the example of the MIB entry provided above, all of the properties of the processor may be included. For example, processorDevicechassisIndex, processorDeviceIndex processorDeviceType ProcessorDeviceType, processorDeviceManufacturerName processorDeviceFamily ProcessorDeviceFamily, processorDeviceMaximumSpeed processorDeviceBrandName and processorDeviceFQDD in the example above are attributes that relate to inventory, while processorDeviceStatus provides the health of the processor, processorDeviceVersionName provides the version of the processor, and processorDeviceCurrentSpeed provides a metric attribute providing details about the current speed of the processor.

Figure 6:
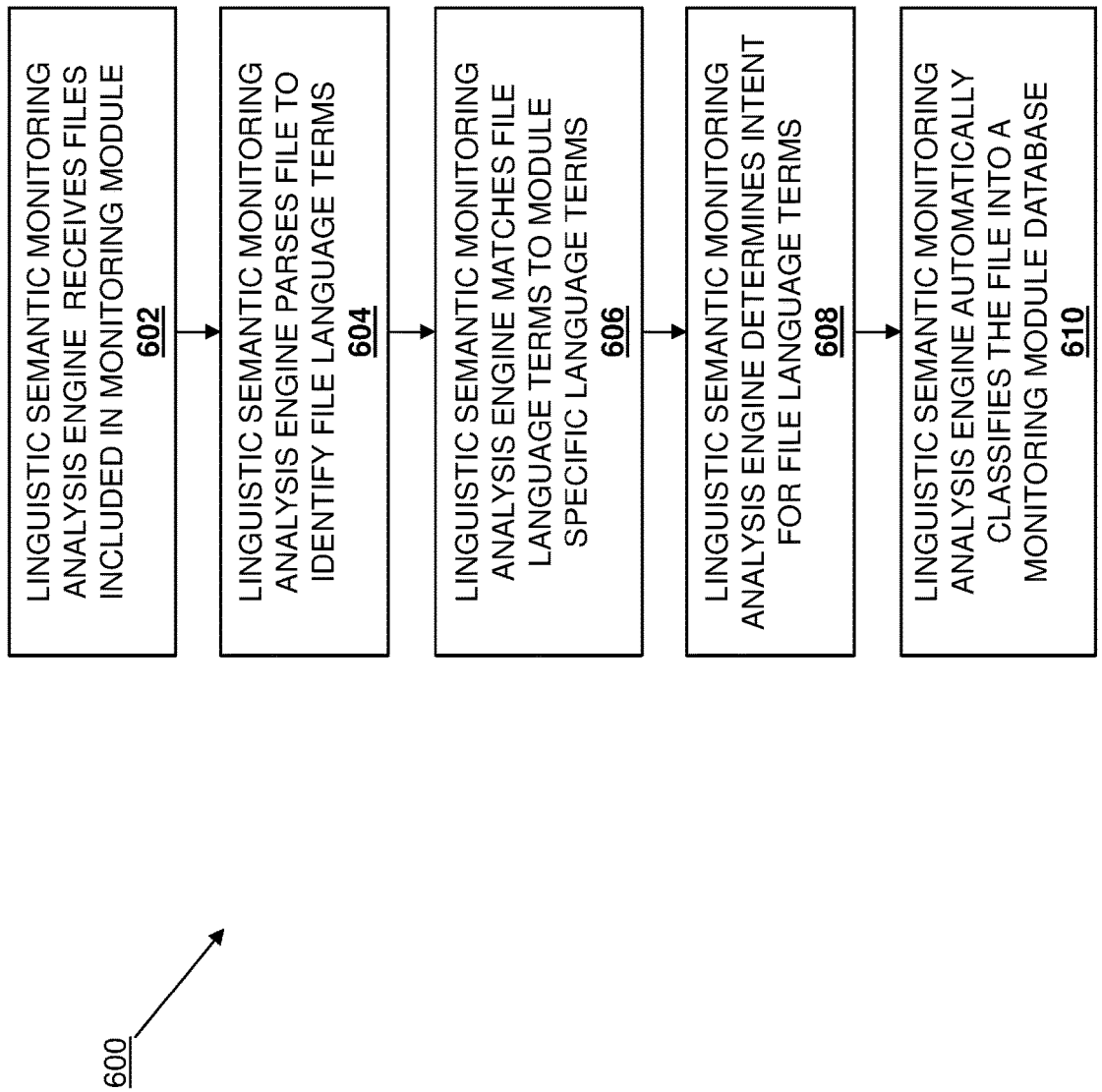
FIG. 6 is a flow chart illustrating an embodiment of a method for integrating monitoring and alerts using linguistic semantic analysis.

Referring now to FIG. 6, an embodiment of a method 600 for integrating monitoring and alerts using linguistic semantic analysis is illustrated. As discussed below, the systems and methods of the present disclosure provide for the integration of monitoring modules into monitoring applications via the use of dictionaries and thesaurus that identify the semantics utilized in the domain/target system in order to perform linguistic semantic analysis on the monitoring module and the monitoring application that allows for artifact name analysis to identify the intent of variables in schema files in order to classify those schema files into monitoring models automatically. In some embodiments, the monitoring modules may include alerts, and the systems and methods may analyze those alerts by identifying their intent, as well as identifying alerts that belong to similar categories in order to enable an alert resolution/consolidation. The systems and methods of the present disclosure eliminate the need for "hand-coding" and the associated maintenance of monitoring modules that is necessary for their integration into applications in order to keep the monitoring provided by the applications up-to-date with regard to their operation in the domain/target system.

In an embodiment, prior to the method 600 of the illustrated embodiment, the linguistic semantic monitoring analysis database(s) 208 may be provided with the information discussed above with reference to FIG. 2. For example, a computing device manufacturer (i.e., of a computing device/domain/target system that is to execute the development operations application 206) may provide the information in the monitoring dictionary database 310 and/or any of the other databases discussed above. As such, the computing device manufacturer may provide the health model variables, the performance/metrics/time series/value variables, the inventory property variables, the threshold type variables, the software versioning attributes, the configuration state variables, the redundancy variables, asset information variables, and/or any other information described herein in the linguistic semantic monitoring analysis database(s) 208. In addition, the computing device manufacturer may provide the type/model information in the linguistic semantic monitoring analysis database(s) 208 as well.

In an embodiment, prior to the method 600 of the illustrated embodiment, the linguistic semantic alert analysis database(s) 408 may be provided with the information discussed above with reference to FIG. 4. For example, a computing device manufacturer (i.e., of a computing device/domain/target system that is to execute the development operations application 406) may provide the information in the alert classification dictionary database 514 and/or any of the other databases discussed above. As such, the computing device manufacturer may provide the health state changes, the threshold crossing events, the configuration events, the operational events, the login/logout and/or security alerts, and/or any other information described herein in the alert classification dictionary database 514 and/or any of the other databases discussed above. Furthermore, the computing device manufacturer may provide the nouns (or noun combinations) and verbs in the domain-specific dictionary database 510, the domain-specific component trees and/or other computing device information in the component tree database 508, as well as the synonyms, antonyms, and state cycles in the domain-specific thesaurus database 510.

In a specific example, state cycles in the domain-specific thesaurus database 510 may include the following:
(Normal normally healthy)⇔(Warning degraded)⇔Critical (for Physical Disk, Virtual Disk)
On⇔Off⇔Failed (for Power Supply)
Normal⇔(less than lower warning threshold | greater than higher warning threshold)⇔(less than lower critical threshold | greater than lower warning threshold) (for Current)

The method 600 begins at block 602 where a linguistic semantic monitoring analysis engine receives a file included in a monitoring module. In an embodiment, at block 602, the linguistic semantic monitoring analysis engine 204/308 may receive files from any of the MIB module 210a, the MOF module 210b, or the JSON module 210c. In a specific example, at block 602, a user of the server system 200 may transfer schema files from any of the MIB module 210a, the MOF module 210b, or the JSON module 210c to the linguistic semantic monitoring analysis engine 204/308. For example, in the event new domain/target system/computing device monitoring support is needed for the development operations application 206, or new firmware monitoring support is needed for the development operations application 206, the method 600 may be initiated at block 602. In a specific example including an iDRAC, the MIB database may be uploaded into the linguistic semantic monitoring analysis engine 204/308. In a specific example including an EqualLogic iSCSI-based storage area network systems available from DELL® Inc. of Round Rock, Tex., United States, all the 13 EqualLogic MIBs may be uploaded to the linguistic semantic monitoring analysis engine 204/308.

The method 600 then proceeds to block 604 where the linguistic semantic monitoring analysis engine parses the file to identify file language terms included in the file. In an embodiment, at block 602, the linguistic semantic monitoring analysis engine 204/308 may parse the different artifacts included in the schema files received from any of the MIB module 210a, the MOF module 210b, or the JSON module 210c. For example, MIB names (e.g., scalar, tables, etc.), MOF class names, and/or JSON object class names may be parsed by the linguistic semantic monitoring analysis engine 204/308 at block 604. In an embodiment, at block 604, the linguistic semantic alert analysis engine 204/308 may utilize the name parser 306 to parse the schema files received from any of the MIB module 210a, the MOF module 210b, or the JSON module 210c at block 602 in order to identify file language terms included in those files. For example, the linguistic semantic analysis engine 204/308 may operate at block 604 to parse the files received at block 602 to determine the names utilized for those files by splitting the file names into file language terms. In a specific example, such file language terms included in the file names may be identified by reversing the Hungarian notations utilized in the file names, splitting the file language terms included in the file names when a underscore ("_") is identified, and/or using other techniques that would be apparent to one of skill in the art in possession of the present disclosure.

In one example of parsing operations that may be performed at block 604, the artifact in the file may include "processorDeviceType". As would be appreciated by one of skill in the art in possession of the present disclosure, Hungarian notation requires that all English words representing a function be combined into a single function name, with first character of every English word capitalized. As such, a function to create a "processor device type" would be named as "processorDeviceType". The linguistic semantic monitoring analysis engine 204/308 may include logic to identify the original English words by splitting the function name "processorDeviceType" at each capital character boundary to identify the words processor, device and type.

In another example of parsing operations that may be performed at block 604, the artifact in the file may include "processor_device_type". As would be appreciated by one of skill in the art in possession of the present disclosure, function names may be built by combining the English words using an underscore "_", with each of the terms in lower case. As such, the processor device type may be defined by the function name "processor_device_type". The linguistic semantic monitoring analysis engine 204/308 may include logic to identify the original English words by splitting the function name using the underscore to identify the words processor, device and type. One of skill in the art in possession of the present disclosure will recognize that the above function naming conventions are almost universally used in the industry. However, other naming conventions followed in a MIB and/or JSON schema may be utilized to perform similar functionality at block 604 while remaining within the scope of the present disclosure as well.

The method 600 then proceeds to block 606 where the linguistic semantic monitoring analysis engine matches the file language terms with module-specific language terms. In an embodiment, at block 606, the linguistic semantic monitoring analysis engine 204 may match the file terms identified in the schema files received for any of the MIB module 210a, the MOF module 210b, or the JSON module 210c with module-specific language terms stored in the linguistic semantic monitoring analysis database(s) 208. For example, the linguistic semantic monitoring analysis engine 204/308 may operate at block 606 to match the file language terms identified in the file(s) received for the MIB module 210a with any of the information included in the linguistic semantic monitoring analysis database(s) 208. In a specific example, the linguistic semantic analysis engine 204 may operate to match file language terms in schema files to module specific language terms included in the monitoring dictionary database 310.

In a specific example, nouns in the monitoring dictionary database 510 may include the terms such as processor, current, physical disk, virtual disk, and/or a variety of other nouns that would be apparent to one of skill in the art in possession of the present disclosure.

In a specific example, the monitoring dictionary database 310 may also include the information in the following table:

| Monitoring Model | English Terms | Enumeration Type Indicators | Type Indicators |
|---|---|---|---|
| Health Model | "Status", "Indication", "Predictive Failure" | "healthy", "failed", "degraded", "major", "fatal", "catastrophic", "on", "off", "normally", "normal" | |
| Performance Model | "Current", "Reading", "Usage", "Statistics", "Used", "Free", "Available" | | Gauge |
| Inventory Model | "Name", "Type", "Model", "Manufacturer", "Speed", "Capacity", "Family", "Rated" | | FQDDString |
| Threshold Model | Threshold | | |
| Versioning Model | Revision, Version | | |
| Configuration State Variable | "State" "Enabled" | | |

In a specific example, the alert classifier dictionary database 514 may also include the information in the following table:

| Alert Classifier | Adverbs/Terms |
|---|---|
| Health State Change | "healthy", "failed", "degraded", "major", "fatal", "catastrophic", "on", "off", "normally", "normal" |
| Threshold Crossing | "exceeded", "below", "threshold", "within", "above", "less than", "greater than" |
| Operational Events | "ready", "building", "starting" "initializing" |
| Configuration State Variable | "Disabled" "Enabled" |

At block 504 and using the MIB database 504, the linguistic semantic monitoring analysis engine 204/308 may select the name of the attributes (e.g., in column 1 of the table below), parse the name into individual words as discussed above (e.g., and illustrated in column 2 of the table below), map the words with the Monitoring classifier dictionary 310 (e.g., as illustrated in column 3 of the table below), and identify the type of the monitoring model that attribute represents (e.g., as illustrated in column 4 of the table below):

| Name in the MIB Schema | Names parsed into individual components | Looking up into the Monitoring Classifier Dictionary | Conclusion |
|---|---|---|---|
| processorDevicechassisIndex | Processor, Devicechassis, Index | Index is Inventory Model | Inventory |
| processorDeviceIndex | Processor, Device, Index | Index is Inventory Model | Inventory |
| processorDeviceStatus | Processor, Device, Status | Status is Health Model | Health |
| processorDeviceType | Processor, Device, Type | Type is Inventory Model | Inventory |
| processorDeviceManufacturer | Processor, Device, Manufacturer | Manufacturer is Inventory Model | Inventory |
| processorDeviceStatusState | Processor, Device, Status, State | State is Configuration Model (when word State comes at the end, it is always Configuration Model | Configuration |
| processorDeviceFamily | Processor, Device, Family | Family is Inventory Model | Inventory |
| processorDeviceMaximumSpeed | Processor, Device, Maximum, Speed | Speed is Inventory Model | Inventory |
| processorDeviceCurrentSpeed | Processor, Device, Current, Speed | Current is Performance Model. (Current always follows with the inventory attribute which it represents) | Performance |
| processorDeviceVersionName | Processor, Device, Version | Version is Verisoning Model | Versioning |
| processorDeviceBrandName | Processor, Device, Brand, Name | Name is Inventory Model | Inventory |
| processorDeviceFQDD | Processor, Device, FQDD | FQDD is Inventory Model | Inventory |

Similarly, at block 504 and using the event catalog database 506, the linguistic semantic monitoring analysis engine 204 may select the message column of the catalog (e.g., as in column 3 of the table below), map words in the message catalog using the Monitoring classifier dictionary 310 (e.g., as illustrated in column 4 of the table below), and identify the type of the monitoring model that attribute represents (e.g., as illustrated in column 4 of the table below):

| Component | Error # | Message | Mapping to Alert Classifier dictionary | Alert Model |
|---|---|---|---|---|
| PSU | 4233 | <PSU Sensor Name> has failed. | "failed" maps to Health State Change | Health |
| PSU | 4234 | <PSU Sensor Name> is switched OFF. | "off" maps to Health State Change | Health |
| PSU | 4235 | <PSU sensor name> is on. | "on" maps to Health State Change | Health |
| PDR | 2299 | Physical disk <number> is operating normally | "normally" maps to Health State Change | Health |
| PDR | 2297 | Fault detected on physical disk <number>. Physical disk has failed | "failed" maps to Health State Change | Health |
| VDR | 4355 | <virtual disk> has returned to normal state | "normal" maps to Health State Change | Health |
| VDR | 4356 | Redundancy of Virtual disk has degraded | "degraded" maps to Redundancy Health State Change | Health |
| VDR | 4357 | Virtual disk failed | "failed" maps to Health State Change | Health |

-continued

| Component | Error # | Message | Mapping to Alert Classifier dictionary | Alert Model |
|---|---|---|---|---|
| Current | 2178 | The system board <name> current is within range. | "within" refers to Threshold crossing events | Threshold |
| Current | 2179 | The system board <name> current is less than the lower warning threshold. | "less than", "lower" refers to Threshold crossing events | Threshold |
| Current | 2179 | The system board <name> current is greater than the upper warning threshold. | "greater than", "upper" refers to Threshold crossing events | Threshold |
| Current | 2180 | The system board <name> current is less than the lower critical threshold. | "less than", "lower" refers to Threshold crossing events | Threshold |
| Current | 2180 | The system board <name> current is greater than the upper critical threshold. | "greater than", "upper" refers to Threshold crossing events | Threshold |

The method 600 then proceeds to block 608 where the linguistic semantic monitoring analysis engine determines intent for the file language terms. In an embodiment, at block 608, the linguistic semantic monitoring analysis engine 204 may utilize the processing of the schema files for any of the MIB module 210a, the MOF module 210b, or the JSON module 210c that was performed at blocks 402, 404, and/or 406 to determine intent for their file language terms. For example, the linguistic semantic analysis engine 204/302 may operate at block 608 to utilize schema file names determined for the schema files in the MIB module 210*a*/302, along with information in the linguistic semantic monitoring analysis database(s) 208, to determine the intent of the file language terms included in the MIB module 210*a*/308. In an embodiment, the intent determined for the file language terms provides for the information in column 5 in the table above, which represents the monitoring module or alert module to which the object belongs. As such, one of skill in the art in possession of the present disclosure will recognize how, following block 608, the schema files in the MIB module 210*a*/412 that provide for the monitoring of particular aspects of objects and/or properties utilized by the domain/target system/computing device may be determined.

The method 600 then proceeds to block 610 where the linguistic semantic monitoring analysis engine automatically classifies the files into monitoring model databases. In an embodiment, at block 610, the linguistic semantic monitoring analysis engine 204 may utilize the intent determined for the file language terms for any of the schema files in the MIB module 210*a*, the MOF module 210*b*, or the JSON module 210*c* to automatically classify those files into a monitoring model database. For example, at block 610, the linguistic semantic monitoring analysis engine 204 may utilize the intent determined for the file language terms in the files of the MIB module 210*a*/308 in order to classify that schema file for the MIB module 210*a*/302 in any one of the inventory model database 314, the health model database 316, or the performance model database 318, as illustrated in the table(s) above.

In a specific example, at blocks 406, 408, and 410, file language terms from schema files may be matched to module-specific language terms in the monitoring dictionary database 310, and the monitoring classifier engine 312 in the linguistic semantic monitoring analysis engine 312 may operate to use that matching to determine intent for the schema files, and then use that intent to classify those schema files into the inventory model database 314, the health model database 316, the performance model database 318, and/or any other monitoring model databases that are available to the linguistic semantic monitoring analysis engine 312. In the event there are multiple monitoring model databases that may be appropriate for a schema file, the type and enumeration values included in properties in the schema file may be used to classify that schema file. One of skill in the art in possession of the present disclosure will recognize that such use of type and enumeration values will typically allow the schema file to be classified into a particular monitoring model. In the event such classification is not possible, manual classification by the user of the server system 200 may be performed.

In the example, utilizing the MIB discussed above, an MIB object "processDeviceStatus" may refer to "ObjectStatusEnum", which is defined as an Enumeration (TEXTUAL-CONVENTION) below:

```
ObjectStatusEnum         ::= TEXTUAL-CONVENTION
    STATUS current
    DESCRIPTION
        "Status of an object."
    SYNTAX INTEGER {
    other(1),           -- the status of the object is not one of the
                        -- following:
    unknown(2),         -- the status of the object is unknown
                        -- (not known or monitored)
    ok(3),              -- the status of the object is ok
    nonCritical(4),     -- the status of the object is warning,
                        non-critical
```

-continued

```
    critical(5),        -- the status of the object is critical (failure)
    nonRecoverable(6)   -- the status of the object is non-recoverable
                        (dead)
}
```

This enumeration in the above example contains key words such as "other", "unknown", "ok", "noncritical", "fatal", and "catastrophic", and the linguistic semantic monitoring analysis engine 204 may determine that these keywords are associated with a Health Model in the Monitoring Classifier Dictionary. Furthermore, the linguistic semantic monitoring analysis engine 204 may determine that the attribute "processorDeviceCurrentSpeed" is indicated as Gauge and, in response, associate it with a Performance Model in the Monitoring Classifier Dictionary. As would be appreciated by one of skill in the art in possession of the present disclosure, such determination may be unnecessary if the parsing discussed above with reference to block 604 is successful.

In an embodiment, component relationships associated with the monitoring of components may be are tracked through associations (e.g., WSMAN associations), index relationships (e.g., SNMP relationships), and/or JSON references. For example, a virtual disk will always have an index that represents its associated contained controller, while sensors may be associated with their relevant subsystem or component indexes that may be used to create a component tree structures.

In the specific example, using the EqualLogic systems discussed above, the following relationship may exist: disk MIB⇒EQLDISK-MIB⇒eqlDiskTable, and may provide for the following:

```
eqlDiskEntry OBJECT-TYPE
-- 1.3.6.1.4.1.12740.3.1.1.1
    SYNTAX    EqlDiskEntry
    MAX-ACCESS  not-accessible
    INDEX { eqlGroupId, eqlMemberIndex, eqlDiskIndex }
    DESCRIPTION
        "An entry (row) containing a list of disk status parameters."
    ::= { eqlDiskTable 1 }
```

Furthermore, the Index for eqlDiskTable (eql, Disk, Table⇒Disk component) may include the following 3 parts:
  eqlGroupId→represents the EqualLogic Group
  eqlMemberIndex→represents the EqualLogic Member within the EqualLogic Group
  eqlDiskIndex→represents the EqualLogic Disk within the EqualLogic Member.

As such, a Disk is contained inside a Member which in turn is contained inside the EqualLogic Group, which would provide the topmost object in the hierarchy.

In some embodiments, there may be aspects associated with monitoring domains. For example, thresholds are typically associated with metrics, while status attributes are typically associated with health, and each may be identified by the name analysis discussed above. In a specific example, thresholds may include names such as "warning threshold", "critical threshold", "upper warning threshold", etc., and the attributes/properties associated with those names may be linked to those thresholds. In the table for the alert classification database discussed above, the threshold events include a "critical threshold", "upper warning threshold" etc., each of which may be considered as part of the threshold events.

In some embodiments, the schema files from the MIB module 210a, the MOF module 210b, or the JSON module 210c may include alert files that are provided to the linguistic semantic alert analysis engine 404/512 at block 602. Following the receiving of the alert file at block 602, the method 600 may proceed to block 604 where the linguistic semantic alert analysis engine 404/512 parses the alert file to identify file language terms included in the alert file, and block 606 where the linguistic semantic alert analysis engine 404/512 matches the file language terms included in the alert file with alert-specific language information in the linguistic semantic alert analysis database(s) 408.

For example, the linguistic semantic alert analysis engine 404/512 may perform the method 600 by splitting the alert file into alert language terms, and matching those alert language terms to module-specific language terms in the alert classification dictionary database 514. In a specific example, this allows the alert files to be classified as "health", "operation", "audit", and/or other alert classifications that would be apparent to one of skill in the art in possession of the present disclosure. In addition, the linguistic semantic alert analysis engine 404/512 may perform the method 600 by looking up nouns in the alert file and matching them to nouns in the domain-specific dictionary database 510, and then using those matching nouns to associate the alert file with a component identified in the component tree database 508. In the event more than one noun is found in the alert file, the longest match may be used. In some examples, multiple components may be referred to in an alert file (e.g., a controller and a virtual disk may be referred to in the alert file), in which case each component referred to in the alert file may be associated with that alert file. One of skill it the art in possession of the present disclosure will recognize that alert files may typically be associated with components that are relatively low in the component tree hierarchy. In the table for the alert classification database discussed above, if a lookup for the components inside the Message column is attempted, "physical disk" will be found in all Physical disk alerts, "current" will be found in all Current related alerts, and "virtual disk" will be found in all Virtual Disk alerts. In situations where a message such as "Virtual disk failed due to physical disk failure" is provided, both "virtual disk" and "physical disk" will be found in the event, and the system may associate the corresponding event to physical disk component.

In addition, the linguistic semantic alert analysis engine 404/512 may perform the method 600 by looking up verbs in the alert file and matching them to verbs in the domain-specific dictionary database 510, and using those verbs to associate the alert file with a specific operation. For example, verbs from the message may be found via the adverbs in the table for the alert classification database discussed above. Following the processing discussed above, the alert file may be mapped to state machines in the domain/target system/computing device. In the event different alert files are mapped to the same component, operation, and classification model, those alert files may be considered part of a candidate set. In some examples, alert files that are part of a candidate set (e.g., belonging to the same category) may operate to cancel each other for certain alert categories (e.g., threshold alerts and health alerts) in order to consolidate those alert files, while in other examples alert files that are part of the same candidate set will not cancel each other.

In a specific example involving an iDRAC with two physical disks ("PD.1" and "PD.2"), the following two events may be generated:

Alert 1 @ Apr. 25, 2018 10:30 AM: Physical disk PD.1 is operating normally
Alert 2 @ Apr. 25, 2018 3:30 PM: Fault detected on physical disk PD.1. Physical disk has failed The linguistic semantic alert analysis engine 404/512 may apply the classification logic discussed above to determine: Alert 1⇒physical disk alert⇒"normally" refers to a first state in the state cycle, and the event is associated with PD.1. Alert 2⇒physical disk alert⇒"failed" refers to a second state in the state cycle that is different than the first state, and the event is associated with PD.1

The matching of the component and the instance allows the linguistic semantic alert analysis engine 404/512 to conclude that these two alerts are related to the same instance but are coming at different points in time. The linguistic semantic alert analysis engine 404/512 may then assume that Alert 2 is the current situation, whereas Alert 1 was an older situation, and may operate to remove Alert 1 or treat Alert 2 as superseding Alert 1.

Following the classification of alert files, when a new alert file is provided, it may be forwarded to the linguistic semantic alert analysis engine 404/512, which may operate to identify whether the new alert file belongs to a particular monitoring model. If so, the linguistic semantic alert analysis engine 404/512 may access the component tree associated with the new alert file and extract the component instance identification in the new alert file (e.g., via the word parsing described above). If existing alert files exist that may be cancelled, the alerts associated with those existing alert files may be cancelled. Otherwise, the new alert file may be appended to the monitoring model as detailed above.

Thus, systems and methods have been described that provide for the integration of monitoring modules into monitoring applications via the use of dictionaries and thesaurus that identify the semantics utilized in the domain/target system in order to perform linguistic semantic analysis on the monitoring module and the application that allows for the name analysis of artifacts to identify the intent of variables in the monitoring module to allow their classification into monitoring models automatically. In some embodiments, the monitoring modules may include alerts, and the systems and methods may analyze those alerts by identifying their intent, as well as identify alerts that belong to similar categories in order to enable an alert resolution/consolidation. The systems and methods of the present disclosure eliminate the need for "hand-coding" and the associated maintenance of monitoring modules that is necessary for their integration into applications in order to keep the monitoring provided by the applications up-to-date with regard to their operation in the domain/target system Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A linguistic semantic analysis monitoring/alert integration system, comprising:
   at least one storage device storing one or more monitoring dictionary databases that include module-specific language information that identifies module-specific language terms utilized in providing a monitoring module; and a processor coupled to the at least one storage device, the processor providing:
a linguistic semantic monitoring analysis engine that is configured to:
receive a first file included in a monitoring module;
parse the first file to identify file language terms included in the first file;
match the file language terms included in the first file with the module-specific language terms included in the module-specific language information;
determine, based on the matching of the file language terms with the module-specific language terms, a first intent for the file language terms; and
automatically classify, based on the determination of the first intent for the file language terms, the first file into a respective one of a plurality of monitoring model databases, and
a monitoring application that is configured to:
access the first file from the respective one of the plurality of monitoring model databases; and
perform monitoring operations based on the first file on a target system coupled to the processor, wherein the monitoring operations include at least one of: monitoring health of the target system, monitoring performance of the target system, or monitoring inventory of the target system.

2. The system of claim 1, wherein the plurality of monitoring model databases include a health model database, a performance model database, and an inventory model database.

3. The system of claim 1, wherein the module-specific language information includes health model variables, performance model variables, and inventory model variables.

4. The system of claim 1, wherein the first file includes one of a Management Information Base (MIB) file, a Meta-Object Facility (MOF) file, and a JavaScript Object Notation (JSON) file.

5. The system of claim 1, wherein the first file is a first alert file.

6. The system of claim 5, wherein the linguistic semantic monitoring analysis engine is configured to:
associate a noun file language term in the first alert file with a component in a computing device;
associate a verb file language term in the first alert file with an operation; and
map the first alert file to a state machine in the computing device based on the classification, the component, and the operation of the first alert file.

7. The system of claim 6, wherein the linguistic semantic monitoring analysis engine is configured to:
cancel at least one second alert file that is mapped to the state machine in the computing device based on the second alert file being mapped to the same classification, the same component, and the same operation as the first alert file.

8. An Information Handling System (IHS), comprising:
a processing system; and
a memory system that is coupled to the processing system and that includes instructions that, when executed by the processing system, cause the processing system to provide:
a linguistic semantic monitoring analysis engine that is configured to:
receive a first file included in a monitoring module;
parse the first file to identify file language terms included in the first file;
match the file language terms included in the first file with module-specific language terms that are included in module-specific language information that is stored in one or more monitoring dictionary databases;
determine, based on the matching of the file language terms with the module-specific language terms, a first intent for the file language terms; and
automatically classify, based on the determination of the first intent for the file language terms, the first file into a respective one of a plurality of monitoring model databases, and
a monitoring application that is configured to:
access the first file from the respective one of the plurality of monitoring model databases; and
perform monitoring operations based on the first file on a target system coupled to the processing system, wherein the monitoring operations include at least one of: monitoring health of the target system, monitoring performance of the target system, or monitoring inventory of the target system.

9. The IHS of claim 8, wherein the plurality of monitoring model databases include a health model database, a performance model database, and an inventory model database.

10. The IHS of claim 8, wherein the module-specific language information includes health model variables, performance model variables, and inventory model variables.

11. The IHS of claim 8, wherein the first file includes one of a Management Information Base (MIB) file, a Meta-Object Facility (MOF) file, and a JavaScript Object Notation (JSON) file.

12. The IHS of claim 8, wherein the first file is a first alert file.

13. The IHS of claim 12, wherein the linguistic semantic monitoring analysis engine is configured to:
associate a noun file language term in the first alert file with a component in a computing device;
associate a verb file language term in the first alert file with an operation;
map the first alert file to a state machine in the computing device based on the classification, component, and operation of the first alert file; and
cancel at least one second alert file that is mapped to the state machine in the computing device based on the second alert file being mapped to the same classification, the same component, and the same operation as the first alert file.

14. A method for integrating monitoring and alerts using linguistic semantic analysis, comprising:
receiving, by a linguistic semantic monitoring analysis system, a first file included in a monitoring module;
parsing, by the linguistic semantic monitoring analysis system, the first file to identify file language terms included in the first file;
matching, by the linguistic semantic monitoring analysis system, the file language terms included in the first file with module-specific language terms that are included in module-specific language information that is stored in one or more monitoring dictionary databases;
determining, by the linguistic semantic monitoring analysis system based on the matching of the file language terms with the module-specific language terms, a first intent for the file language terms;
automatically classifying, by the linguistic semantic monitoring analysis system based on the determination of the first intent for the file language terms, the first file into a respective one of a plurality of monitoring model databases, accessing, by a monitoring application operating on the linguistic semantic monitoring analysis system, the first file from the respective one of the plurality of monitoring model databases; and performing, by the monitoring application, monitoring operations based on the first file on a target system coupled to the linguistic semantic monitoring analysis system, wherein the monitoring operations include at least one of: monitoring health of the target system, monitoring performance of the target system, or monitoring inventory of the target system.

15. The method of claim 14, wherein the plurality of monitoring model databases include a health model database, a performance model database, and an inventory model database.

16. The method of claim 14, wherein the module-specific language information includes health model variables, performance model variables, and inventory model variables.

17. The method of claim 14, wherein the first file includes one of a Management Information Base (MIB) file, a Meta-Object Facility (MOF) file, and a JavaScript Object Notation (JSON) file.

18. The method of claim 14, wherein the first file is a first alert file.

19. The method of claim 18, further comprising:

associating, by the linguistic semantic monitoring analysis system, a noun file language term in the first alert file with a component in a computing device;

associating, by the linguistic semantic monitoring analysis system, a verb file language term in the first alert file with an operation; and mapping, by the linguistic semantic monitoring analysis system, the first alert file to a state machine in the computing device based on the classification, the component, and the operation of the first alert file.

20. The method of claim 19, further comprising:

cancelling, by the linguistic semantic monitoring analysis system, at least one second alert file that is mapped to the state machine in the computing device based on the second alert file being mapped to the same classification, the same component, and the same operation as the first alert file.

* * * * *